May 31, 1932. J. J. KEYSER 1,860,714

LUBRICATION OF SPINDLE BEAMS OF SPINNING AND TWISTING MACHINES

Filed March 13, 1930

Inventor:
Johann J. Keyser
BY
Munn&Co.
ATTORNEYS

Patented May 31, 1932

1,860,714

UNITED STATES PATENT OFFICE

JOHANN JACOB KEYSER, OF AARAU, SWITZERLAND

LUBRICATION OF SPINDLE BEAMS OF SPINNING AND TWISTING MACHINES

Application filed March 13, 1930, Serial No. 435,540, and in Switzerland March 20, 1929.

This invention is concerned with an improved lubricating system for spinning, twisting and the like machines having a plurality of spaced, worm gear actuated spindles, the main object of my invention being to provide a circulation of the lubricant so as to obtain a substantially uniform lubrication of all the spindle drives pertaining to one particular beam.

In the actual operation of beams of the character indicated, at which the spindles are actuated by worm gears, it is found that, as all of the gears are having the same pitch, the lubricant is fed or advanced to the one end of the spindle beam, so that part of the spindles are frequently not supplied with sufficient lubricant and accordingly running dry. It is the purpose of this invention to do away with this drawback by providing for beams of the type described a continuous and uniform lubricant circulation.

According to my invention I arrange a connecting conduit or passage between the ends of the gear lubricating channels or recesses of the spindle beam or beams, so that the lubricant moved by the worm gears towards the one end of a beam may continuously return back to the other end thereof, whereby any excess of lubricant at the one end and scarcity of lubricant at the other end of the beam or beams is successfully avoided.

In the drawings, illustrating two preferred embodiments of my invention,

Figure 1:
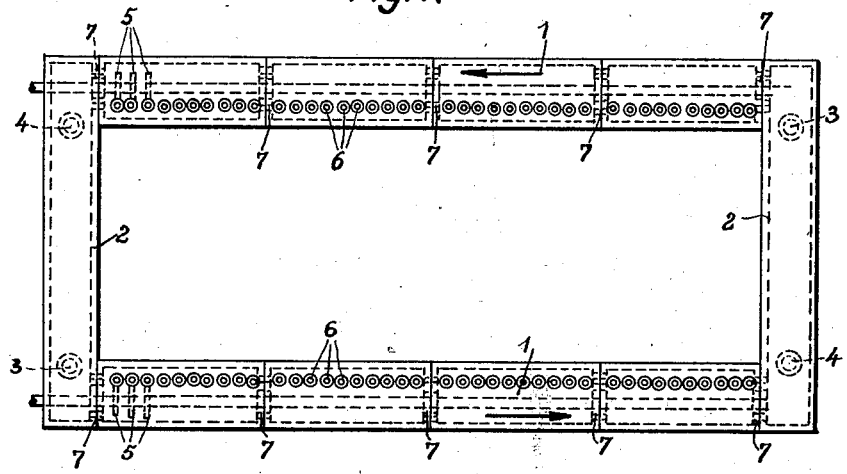
Fig. 1 is a diagrammatic plan view of a machine having two spindle beams.
Figure 2:
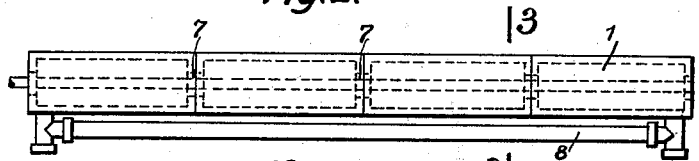
Fig. 2 is the side view of one spindle beam provided with an oil lubricant circulating system according to my invention.
Figure 3:
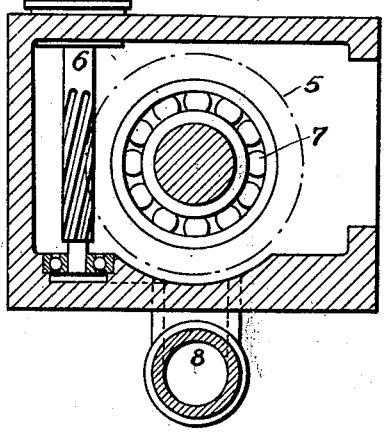
Fig. 3 is a section along line 3—3, Fig. 2.

The machine illustrated diagrammatically in Fig. 1 comprises two spaced and parallel spindle beams, each beam comprising a casing having a plurality of sections placed end to end in a fixed and permanent relation and constituting with their bottom walls a lengthwise lubricant channel or duct, as clearly shown in Fig. 3. The ends of the two beams are besides connected by transverse connecting members or lubricant passages 2 having each filling and discharge spouts 3 and 4 plugged by any suitable or known mechanism. The beams 1 are each provided with a plurality of spindles 6 arranged side by side and are actuated by worm gears 5 mounted on a common longitudinal shaft, which is well-known with machines of this character. Ball bearings 7 support the spindle actuating shafts and constitute means for establishing lubricant communication between the sections of either beam and between the two beams 1 and their connecting heads 2 respectively so as to provide a lubricant circulation path. In the actual operation of the spindles the lubricant is, on account of all the spindle actuating worms and worm gears being arranged at the same angular pitch, passed from the one to the other end of the beams and through the ball bearings 7, as indicated by the arrows in Fig. 1. At the end of the beams it flows through the end ball bearing 7 into the connecting heads 2 so as to be returned back to the front end of its spindle beam in a closed path, as will be readily understood, so that all of the spindles and spindle actuating gears are lubricated in a substantially positive and uniform way.

This lubricant circulation has the still further advantage, that the operating parts of the beam or beams can, after the lubricant having been drained, most conveniently be cleaned with petrol or benzine while the machine is running idle and without the necessity of dismounting the machine, the cleaning liquid being passed over the same closed path or cycle as the lubricant.

If the machine is provided with but one spindle beam, as shown in Fig. 3, the oil or lubricant circulation is obtained by the intermediary of a tube 8 connecting both ends of the beam. This tube 8 may be replaced by a duct or channel cast integral with the body or casing of the spindle beam, as will be readily understood without further description or illustration.

What I claim is:

1. In a machine of the character described a hollow spindle beam supporting a plurality of spaced spindle actuating worm gears and constituting a lubricant duct permitting endwise flow of a lubricant, past the said worm gears under the influence of the worm gear operation and a lubricant conduit communicating with the said lubricant duct and constituting therewith an endless lubricant passage permitting a continuous and uniform lubricant circulation through the spindle beam.

2. In a machine of the character described a hollow spindle beam supporting a plurality of spaced spindle actuating worm gears and comprising a plurality of hollow beam sections placed end to end so as to form a rigid and unitary beam structure, and constituting a lubricant duct permitting endwise flow of a lubricant past the said worm gears under the influence of the worm gear operation and a lubricant conduit communicating with the said lubricant duct and constituting therewith an endless lubricant passage permitting a continuous and uniform lubricant circulation through the spindle beam.

3. In a machine of the character described two spaced hollow spindle beams each supporting a plurality of spaced spindle actuating worm gears and constituting a lubricant duct permitting endwise flow of a lubricant past the worm gears carried by the individual beams under the influence of the worm gear operation and lubricant conduits communicating with the lubricant ducts of the two spindle beams and constituting therewith one endless lubricant passage permitting a continuous and uniform lubricant circulation through both spindle beams.

4. In a machine of the character described a plurality of spindle beams each supporting a plurality of spaced spindle actuating worm gears and constituting a lubricant duct permitting endwise flow of a lubricant past the worm gears supported by the individual spindle beams under the influence of the worm gear operation, and a plurality of lubricant conduits communicating with the lubricant ducts of the spindle beams and constituting therewith an endless lubricant passage permitting a continuous and uniform lubricant circulation through all of the individual spindle beams.

5. In a machine of the character described hollow spindle beams supporting spaced spindle actuating worm gears and each constituting a lubricant duct extending from the one end to the other of the individual spindle beams so as to permit endwise flow of a lubricant past the said worm gears under the influence of the worm gear operation, and lubricant conduits connecting the ends of the lubricant ducts of the individual spindle beams and constituting therewith an endless lubricant passage permitting a continuous and uniform lubricant circulation through the spindle beams.

6. In a machine of the character described spindle beams comprising casings having a plurality of sections placed end to end and constituting a lubricant channel, hollow connecting members between said beams, said casings and said connecting members forming an endless lubricant passage permitting a continuous lubricant circulation, a plurality of spindles in said beams, a longitudinal shaft, worm gears mounted on said shaft and actuating said spindles, ball bearings supporting said shaft, said ball bearings constituting means for establishing lubricant communication between the sections of said casings and between said casings and said connecting members, the lubricant being moved by said worm gears towards one end of a beam and returning at the other end thereof.

7. In a machine of the character described a spindle beam comprising a casing having a plurality of sections placed end to end and constituting a lubricant channel, means connecting the ends of said casing and forming together with said casing an endless lubricant passage permitting a continuous lubricant circulation, a plurality of spindles in said beam, a longitudinal shaft, worm gears mounted on said shaft and actuating said spindles, ball bearings supporting said shaft, said ball bearings constituting means for establishing lubricant communication between the sections of said casing, the lubricant being moved by said worm gears towards one end of a beam and returning at the other end thereof.

In testimony whereof I affix my signature.

JOHANN JACOB KEYSER.